Figure 1:
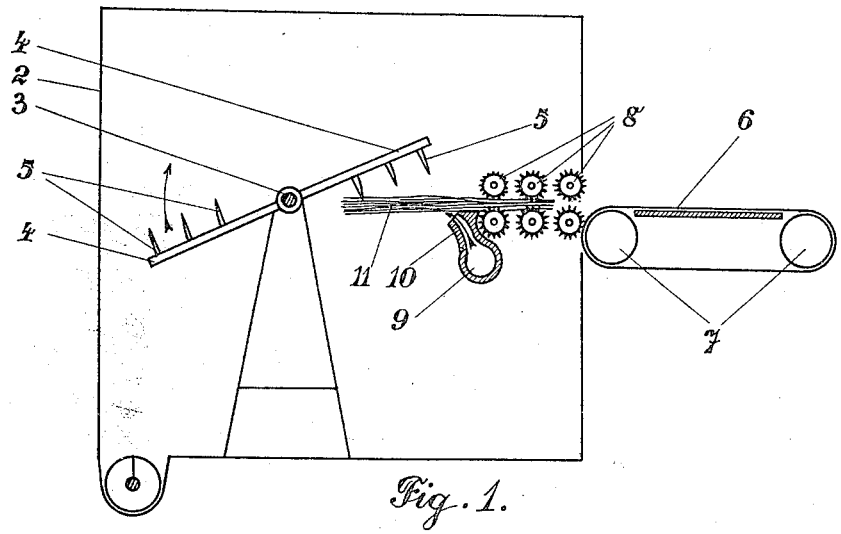

March 11, 1924.

F. A. POŽÁR

MEANS FOR SCUTCHING AND BREAKING FIBROUS PLANT STALKS

Filed May 22, 1922

1,486,684

Patented Mar. 11, 1924.

1,486,684

UNITED STATES PATENT OFFICE.

FRANTIŠEK A. POŽÁR, OF CESKA BELA, CZECHOSLOVAKIA.

MEANS FOR SCUTCHING AND BREAKING FIBROUS PLANT STALKS.

Application filed May 22, 1922. Serial No. 562,754.

*To all whom it may concern:*

Be it known that I, František A. Požár, a citizen of Czechoslovakia, residing at Ceska Bela, Czechoslovakia, have invented certain new and useful Improvements in Means for Scutching and Breaking Fibrous Plant Stalks, of which the following is a specification.

My invention has reference to means for generally improving the mechanical treatment and preparation of fibrous plant stalks preparatory to the production of textile and other material therefrom, and in the practical application of my invention I provide means for first positioning the material by the mechanical action of an air current or the like, the stalks being given a substantially horizontal position and being retained in suspension by the force of the blast, and, while in this position, being at the same time mechanically treated with scutching knives or the like in the usual manner.

In the drawings affixed to this specification and forming part thereof I have shown by way of example and as an illustration, a machine embodying the principles of my invention.

Figure 2:
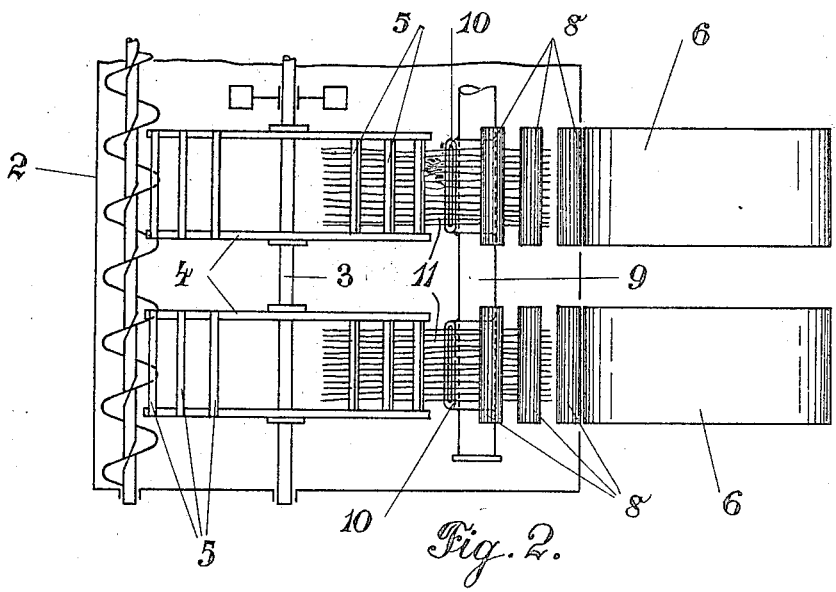

Figure 1 being a vertical sectional view in a somewhat diagrammatic representation; while Figure 2 is a conventional representation of a top plan view of a machine of this kind.

As appears from the drawing, 2 is a box or casing containing a shaft 3 upon which two-armed vanes 4 with scutching knives 5 are rotatably mounted. The plant stalks which are to be submitted to the breaking and scutching process are spread upon the endless apron 6 guided on rollers 7, and after the starting of the machine, are conducted into the three pairs of fluted rollers 8 housed in the box 2 near a corresponding entrance opening thereof. These rollers 8 constitute the breaking means and also the feeding means for the feeding and discharging of the plant stalks into and from the box 2. Beneath the rollers 8 a pipe conduit 9 is arranged with suitably shaped nozzles 10 for the purpose of admitting a blast of air of suitable strength below the plant stalks 11 which are fed into the box 2 for about two thirds of their length, whereupon the rollers 8 are arrested and the ends of the plant stalks are pinched and retained between the rollers. By the action of the blast blown below the plant stalks from the nozzles 10 the said stalks introduced into the box 2, instead of being kept downwardly suspended are retained floating or in suspension in a substantially horizontal position by the current issuing from the nozzles 10, and while so suspended are treated by the revolving scutching knives 5. In view of the favorable position of the horizontally suspended plant stalks which in the stretched position are at the same time beaten by all the scutching knives 5 of the vane 4, the stalks are most efficiently treated. After each stroke of the vane 4 the blast straightens and erects the bent plant fibers immediately so that each subsequent stroke of the vane 4 causes the horizontally suspended material to be submitted to the full vigor of all the scutching knives.

The plant fibers are pushed into the box for about three quarters of their length for treatment, and, after one side of the plant stalks has been treated, the material to be treated is returned upon the table 6 by reversing the direction of movement of the rollers 8, and after the reversing of the plant stalks the other end of the same is introduced for treatment into the box 2.

With a view of accelerating the treatment and for increasing the efficiency I preferably arrange four machines of the kind described side by side of each other and mounted in a common casing or box 2. With a compound machine thus obtained only one end and one side only of the spread-out bundle of plant stalks is treated upon the first table 6, whereupon this partially treated material is transferred to the operator at the next adjoining table for further treatment at the other end. Then the material is treated on the other sides upon the third and fourth tables, which has the advantage that the rollers upon the second and third tables and the corresponding scutching knives may be more delicately constructed. In the case of a single machine with one table and accessories it is, however, necessary to introduce every bundle of plant stalks in spread-out condition into the machine four times after the necessary reversals of the stalks.

Waste is carried away by the blast into the rear part of the box 2 which contains other well known devices and instrumentalities for the treatment of such waste and for other purposes.

The invention is susceptible of a variety of modifications and changes to suit existing conditions and the convenience of the user, and the nature of the particular material to be treated, and without thereby deviating from the spirit and scope of my invention as expressed by the claims.

I claim:

1. The improved scutching of fibrous plant stalks, comprising means for submitting plant stalks to the force of a blast and thereby keeping them in a substantially horizontal position, and means adapted to submit them to a scutching action while in this position.

2. The improved scutching of fibrous plant stalks, comprising means for submitting previously broken plant stalks in spread out condition to the mechanical action of a blast, thereby retaining them in substantially horizontal suspension, means adapted for submitting them, while in this position, to scutching action, and means for separating the material from the waste.

3. The improved scutching of fibrous plant material, comprising means for submitting said material to a preparatory loosening treatment, means for treating said material in spread-out condition with a blast and thereby keeping it substantially in horizontal suspension, means adapted for submitting the material to scutching while in this position and means for separating the waste from the material thus treated.

4. In a plant scutching machine in combination, a plurality of breaking and feeding rollers, and blast introducing means operatively associated with said rollers and adapted to effect the substantially horizontal suspension of the material treated by said rollers.

In testimony whereof I affix my signature.

FRANTIŠEK A. POŽÁR.

Witnesses:
MILOSLAV HRUBÝ,
JUSTEY BOHÁŽ.